US012603496B2

(12) United States Patent
Heelan et al.

(10) Patent No.: US 12,603,496 B2
(45) Date of Patent: Apr. 14, 2026

(54) POWER SOURCE ASSEMBLY

(71) Applicant: Kongsberg Discovery AS, Horten (NO)

(72) Inventors: Phil Heelan, Asker (NO); Johan Mattsson, Trångsund (SE)

(73) Assignee: Kongsberg Discovery AS, Horten (NO)

( * ) Notice: Subject to any disclaimer, the term of this patent is extended or adjusted under 35 U.S.C. 154(b) by 0 days.

(21) Appl. No.: 18/850,045

(22) PCT Filed: Mar. 24, 2023

(86) PCT No.: PCT/NO2023/050065
§ 371 (c)(1),
(2) Date: Sep. 23, 2024

(87) PCT Pub. No.: WO2023/182892
PCT Pub. Date: Sep. 28, 2023

(65) Prior Publication Data
US 2025/0219404 A1      Jul. 3, 2025

(30) Foreign Application Priority Data

Mar. 24, 2022    (NO) .................................... 20220359

(51) Int. Cl.
*H02J 1/10*        (2026.01)
*B63G 8/00*        (2006.01)
(Continued)

(52) U.S. Cl.
CPC ............... *H02J 1/10* (2013.01); *B63G 8/001* (2013.01); *G01V 3/083* (2013.01);
(Continued)

(58) Field of Classification Search
None
See application file for complete search history.

(56) References Cited

U.S. PATENT DOCUMENTS

2004/0095098 A1* 5/2004 Turner ................... H02J 7/345
                                                          320/167
2013/0026831 A1   1/2013 Sihler et al.
                          (Continued)

FOREIGN PATENT DOCUMENTS

CN        110171298 A      8/2019
CN        112737040 A      4/2021
                (Continued)

OTHER PUBLICATIONS

International Search Report received in International Application No. PCT/NO2023/050065, mailed May 15, 2023.
(Continued)

*Primary Examiner* — Daniel Cavallari
*Assistant Examiner* — Aqeel H Bukhari
(74) *Attorney, Agent, or Firm* — Knobbe, Martens, Olson & Bear, LLP

(57)                ABSTRACT

The disclosure relates to a power source assembly for powering high current low impedance devices from an Autonomous Underwater Vehicle, AUV, battery pack and/or auxiliary battery packs, comprising: one or more high current low impedance devices, a high current power source, wherein the high current low impedance device is powered by the high current power source, one or more AUVs, the one or more AUVs comprising an AUV and/or auxiliary battery pack, and the high current power sources, the high current low impedance device further comprising a high current supply module comprising an electronic circuit adapted to: supply a current from the AUV battery pack or AUV and/or auxiliary battery pack, store the supplied power in the high current power source, and supply high current to a connected high current output device.
(Continued)

The disclosure further relates to a method for maintaining the power source assembly and a system for a powering the high current low impedance devices.

21 Claims, 8 Drawing Sheets

(51) Int. Cl.

| | | |
|---|---|---|
| *G01V 3/08* | (2006.01) | |
| *H02J 105/30* | (2026.01) | |
| *H02J 105/37* | (2026.01) | |

(52) U.S. Cl.
 CPC .. *B63G 2008/004* (2013.01); *G01V 2003/084* (2013.01); *H02J 2105/31* (2026.01); *H02J 2105/37* (2026.01)

(56) References Cited

U.S. PATENT DOCUMENTS

| | | | |
|---|---|---|---|
| 2013/0093426 A1* | 4/2013 | Peppe | G01V 3/083 |
| | | | 324/365 |
| 2016/0087460 A1 | 3/2016 | Rich et al. | |
| 2017/0369137 A1* | 12/2017 | Smith | G05D 1/0875 |
| 2020/0395764 A1 | 12/2020 | Kuznetsov | |
| 2021/0380000 A1 | 12/2021 | Trivedi et al. | |

FOREIGN PATENT DOCUMENTS

| | | |
|---|---|---|
| DE | 10106521 C1 | 7/2002 |
| EP | 3264552 A1 | 1/2018 |

OTHER PUBLICATIONS

Norwegian Search Report received in Norwegian Application No. NO20220359, dated Oct. 24, 2022.

* cited by examiner

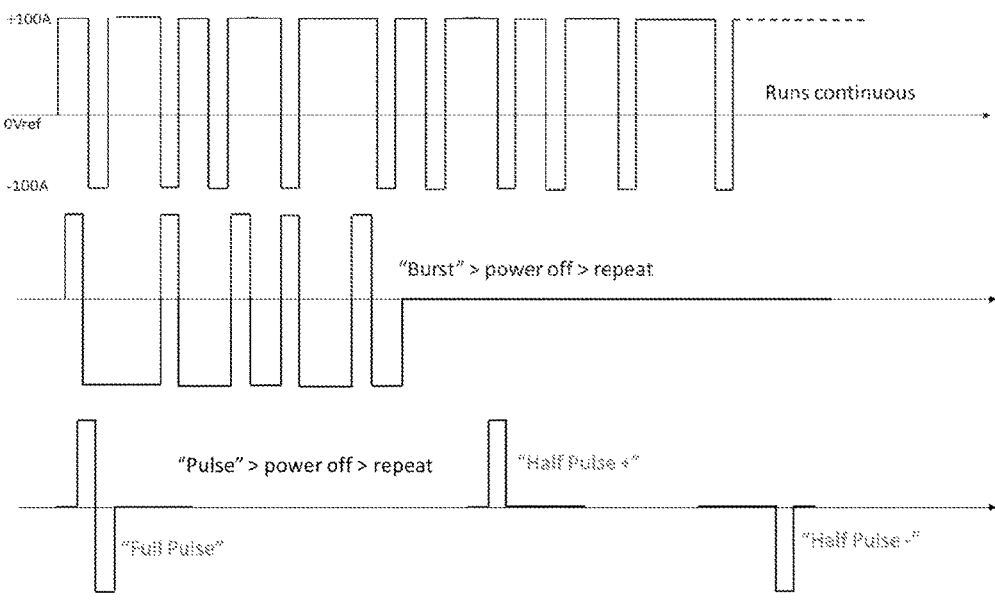
Fig. 8
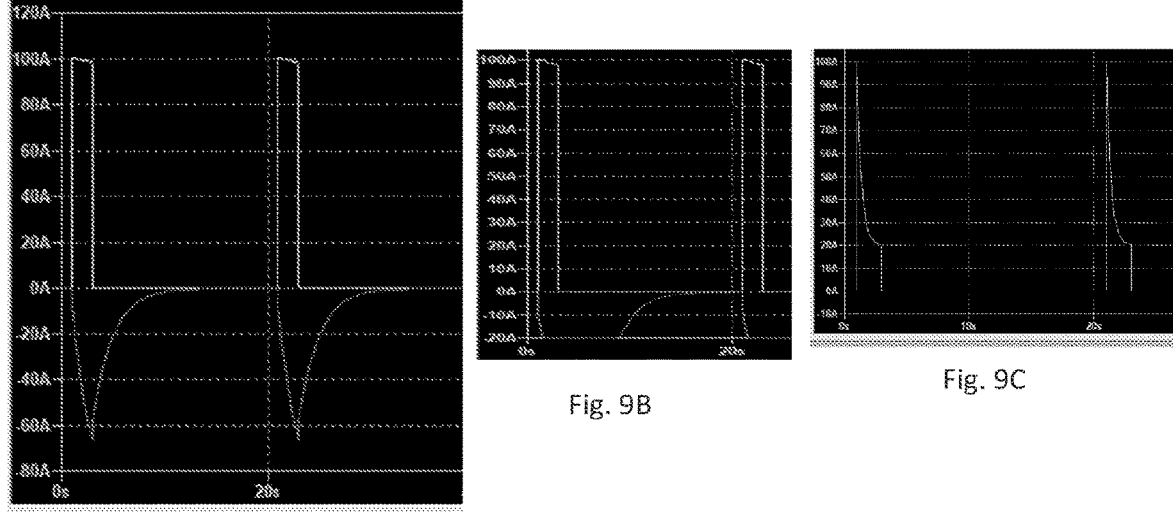
Fig. 9A
Fig. 9B
Fig. 9C
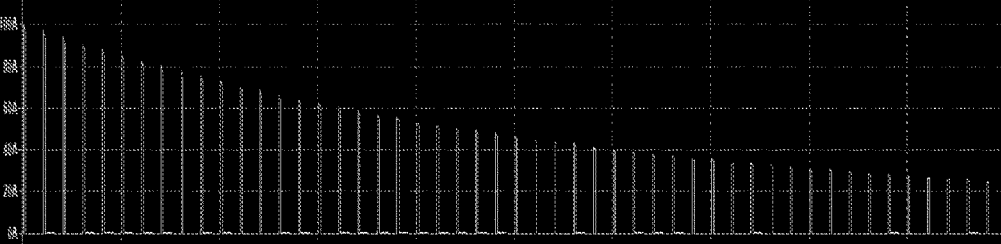
Fig. 9D

36VDC
100A
3.6kW

Battery
Pack

Tx Drive (high power)

2

1, 1'

Load
0.3 Ohms approx

μC

DC-DC (100V)
gateway
out

6VDC
15A
90W

Tx Drive
(mini)

1, 1'

Load
0.3 Ohms approx

Ethernet

2'

AUV
battery
pack 120V current
limited

CSEM
Battery
Pack

36VDC

POWER SOURCE ASSEMBLY

TECHNICAL FIELD

The present disclosure relates to a power source assembly for powering high current low impedance devices from an autonomous underwater vehicle, a method for maintaining a power source assembly for powering high current low impedance devices from an autonomous underwater vehicle and a system for a powering a high current low impedance devices from an autonomous underwater vehicle. More specifically, the disclosure relates to a power source assembly for powering high current low impedance devices from an autonomous underwater vehicle, a method for maintaining a power source assembly for powering high current low impedance devices from an autonomous underwater vehicle and a system for a powering a high current low impedance devices from an autonomous underwater vehicle as defined in the introductory parts of the independent claims.

BACKGROUND ART

Using high current low impedance devices such as Controlled Source Electromagnetics, CSEM, transmitter, Tx, for exploration of underwater structures, sea floor and underground seafloor is widely adapted. Such devices require a high current output, typically above 100 A, to be launched into for example sea water. Output devices are normally arranged on/in a ship hull below the waterline, and is powered by on board power source. Lately it has been seen various solutions using AUVs attached to a mother ship via an umbilical or the like for power supply and control communication. A problem with the solutions of the prior art is that on deep waters there are unpractical and difficult to supply the current amounts necessary for enabling meaningful analysis of sea floor and underground below.

Custom high current rate battery packs are extremely expensive to develop and produce, and therefore unconnected AUVs without power supply via umbilical, has not been available for use with high current low impedance devices such as Controlled Source Electromagnetics, CSEM, transmitters.

Powering Tx from non-ideal Battery source creates several problems. When switching, typical example is that Tx requires 3.6 kW (100 A, 37V instantly from some external source), 100 A at load, or 31 A from 118V battery. This requires an extremely heavy duty DCDC Converter, which will get very hot (about 400 W while switching). Additionally the power losses at very best is in the region of 10-20% of load power demand, but more likely such losses are in the region of 70% for high power DCDC. This would put heavy demand on an AUV battery.

Thus, the technology has a limited reach.

There is thus a need for improved techniques allowing seafloor and the underground below to be surveilled also in deep waters, normally out of reach for prior art techniques.

SUMMARY

It is an object of the present disclosure to mitigate, alleviate or eliminate one or more of the above-identified deficiencies and disadvantages in the prior art and solve at least the above mentioned problem. According to a first aspect there is provided a power source assembly for powering high current low impedance devices from an Autonomous Underwater Vehicle, AUV, battery pack and/or auxiliary battery packs, comprising: one or more high current low impedance devices, a high current power source, the high current low impedance device is powered by the high current power source, one or more AUVs, the one or more AUVs comprising an AUV and/or auxiliary battery pack, and the high current power sources being configurable to provide a high current supply to the high current low impedance devices at one or more predefined current ranges.

By facilitating an AUV with a high current power sources with sufficient capacity to drive the high current low impedance devices arranged in/on the AUV, it would be possible to eliminate the need for an umbilical, which again would allow exploitation of deep waters.

The AUV battery pack and/or auxiliary battery pack may in some embodiments constitute the high current power source.

According to some embodiments, the high current low impedance device further comprises: a high current supply module comprising an electronic circuit adapted to: supplying a current from the AUV battery pack and/or auxiliary battery pack, store the supplied power in the high current power source, and supply high current to a connected high current output device.

Many high current low impedance devices requires current rates in a range too high to be supplied by traditional AUV battery packs. Being able to use the standard AUV battery pack and/or auxiliary battery pack is however of great value, as custom high current rate battery packs are extremely expensive to develop and produce.

According to some embodiments, the high current output device is a Controlled Source Electromagnetics, CSEM, transmitter.

According to some embodiments, the high current power source is a high-capacity capacitor module, Super-CAP module, the super-CAP module comprises one or more high-capacity capacitors, Super-CAPs.

A high-current capacity module based on capacitor technology, such as Super-CAPs, may provide sufficient current rates at desired voltage for driving the high current low impedance devices.

According to some embodiments, the high current supply module may further comprises: a DCDC converter coupled to the AUV battery pack and/or auxiliary battery pack, the AUV battery pack and/or auxiliary battery pack supplying power at a limited preconfigured current rate, and the DCDC converter and the Super-cap module may be connected in parallel to power the high current output device.

According to some embodiments, the high current supply module is configured to:

supply a high current from the super-CAP module to the high current output device for a first predefined period of time of a switching cycle, by discharging the one or more Super-CAPs, and supply power at a preconfigured current rate from the AUV battery pack and/or auxiliary battery pack for a second predefined period of time of the switching cycle, for recharging the Super-cap module.

The switching period enables the Super-CAP module to be recharge between each discharge period.

According to some embodiments, the DCDC converter and the Super-cap module are arranged in a first pressure housing device.

According to some embodiments, the DCDC converter and the Super-cap module are arranged in separate first and second pressure housing devices correspondingly.

According to some embodiments, the high current output device is arranged in the first pressure housing device.

Using pressure housing around vulnerable components establishes a more secure and adaptable design.

According to some embodiments, the high current power source is configured to:

discharge a current rate in the range 25 A to 150 A for a period of more than 1 second, and charge at a minimum current rate of more than 10 A for a period of more than 2.5 seconds, and thus sustaining a switching cycle wherein the high current power source is sufficiently recharge to enable required discharge current rate for specified discharge period at next discharge switching period.

According to some embodiments, the high current power source is configured to:

discharge a current rate of more than 80 A for a period of more than 2 second, and charge at a minimum current rate of more than 10 A for a period of more than 10 seconds.

According to some embodiments, wherein the CSEM transmitter further the power comprises: at least one Tx Drive/Bridge, a controller module, for controlling the at least one Tx Drive/Bridge, at least one pair of electric current electrodes mounted on the one or more AUVs, the at least one pair of electric current electrodes being supplied by the Tx Drive/Bridge, and the high current power sources are electrically connected to and provides current to the Tx Drives/Bridges and the electric current electrode pairs.

By providing a flexible and adaptable high current power sources it is possible to provide many high current output devices, of various configurations, on the same AUV, and thus increase efficiency and adaptability to many tasks.

According to some embodiments, the at least one pair of electric current electrodes is a wide range high current-low impedance device, wide range high current range is in the range 10-150 A, and low impedance device load is in the range 0.2-0.5 ohms.

According to some embodiments, the at least one pair of electric current electrodes is one or more of:

high current-low impedance device, and low current-low impedance device.

In the present disclosure the following definitions shall apply: high current is in the range 10-200 A or alternatively in the range 25-150 A, low current is in the range 1-25 A, and low impedance device load is in the range 0.1-10 ohm, more advantageously, 0.1-5 ohms, and even more advantageously 0.2-0.5 ohms ohms. Current ranges may overlap depending on application and environmental conditions. As will the impedance device load specifications vary as the environment (water parameters such as conducting capacity, temperature, vegetation, pollution and other) changes.

According to some embodiments, the controller module enables switching output from the at least one Tx Drive/Bridge in one or more of predefined digital patterns, and the predefined digital patterns may be one or more of, but not limited to: continuous, burst, and pulse According to a second aspect there is provided a method for maintaining a power source assembly for powering high current low impedance devices from an Autonomous Underwater Vehicle, AUV, battery pack, the method comprising the following steps: for one or more high current low impedance devices, and one or more AUVs:

providing a power source assembly according as defined above, powering at least one pair of the electric current electrodes arranged on the AUV, the electric current electrodes being in contact with seawater, and feeding a preset current to the electric current electrodes from the power source assembly according to a predefined digital pattern.

According to a third aspect there is provided a system for powering a high current low impedance devices from an Autonomous Underwater Vehicle, AUV, battery pack and/or auxiliary battery pack, the system comprising:

one or more AUV assemblies, one or more high current low impedance devices and a power source assembly for powering the high current low impedance device as described above, a remote control module, and a communication channel for providing data communication between the high current low impedance device and AUVs, and the remote control module.

Effects and features of the second and third aspects are to a large extent analogous to those described above in connection with the first aspect. Embodiments mentioned in relation to the first aspect are largely compatible with the second and third aspects.

The present disclosure will become apparent from the detailed description given below. The detailed description and specific examples disclose preferred embodiments of the disclosure by way of illustration only. Those skilled in the art understand from guidance in the detailed description that changes and modifications may be made within the scope of the disclosure.

Hence, it is to be understood that the herein disclosed disclosure is not limited to the particular component parts of the device described or steps of the methods described since such device and method may vary. It is also to be understood that the terminology used herein is for purpose of describing particular embodiments only, and is not intended to be limiting. It should be noted that, as used in the specification and the appended claim, the articles "a", "an", "the", and "said" are intended to mean that there are one or more of the elements unless the context explicitly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTIONS OF THE DRAWINGS

The above objects, as well as additional objects, features and advantages of the present disclosure, will be more fully appreciated by reference to the following illustrative and non-limiting detailed description of example embodiments of the present disclosure, when taken in conjunction with the accompanying drawings.

FIG. 8 shows different pulse pattern scenarios.

FIG. 9A-9D shows current scenarios.

FIG. 11 shows an implementation having battery backup features together with an AUV.

DETAILED DESCRIPTION

The present disclosure will now be described with reference to the accompanying drawings, in which preferred example embodiments of the disclosure are shown. The disclosure may, however, be embodied in other forms and should not be construed as limited to the herein disclosed embodiments. The disclosed embodiments are provided to fully convey the scope of the disclosure to the skilled person.

The devices of present disclosure, powering high current low impedance devices, may be a wide range of devices, but is exemplified in this disclosure and figure as a Controlled Source Electromagnetics, CSEM, transmitter. It should be understood however, that any type of subsea equipment that is advantageously arranged in a disconnected unit, such as an AUV, shall be part of the inventive concept described herein.

CSEM is a geophysical method used for mapping subsurface resistivity. There are essentially two variants of this technology, land CSEM, and marine CSEM.

In marine CSEM, electromagnetic transmitters and receivers are commonly used in underwater operations for subsea resistivity mapping.

Figure 1:
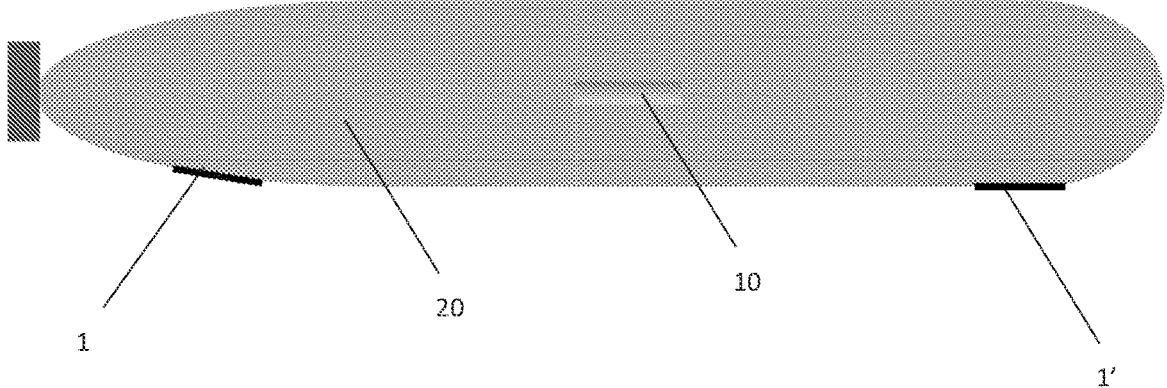
FIG. 1 shows an AUV having a pair of Controlled Source Electromagnetics, CSEM, transmitter arranged on the hull according to an embodiment of the present disclosure.

Common applications of CSEM technology in subsea environments include:

1. Detection of buried objects like sea mines and unexploded ordnance (UXO)
2. Oil and gas exploration
3. Mineral exploration An AUV is shown in FIG. 1, and in FIG. 2 it can be seen a lead source AUV is trailed by a receiver AUV. This is a typical embodiment wherein the technology of present disclosure can increase efficiency, flexibility, and availability of deep water surveillance.

Driving a CSEM transmitter from a standard AUV battery is not practical, and thus the technology has been limited to AUV's being constrained by an umbilical feeding required power to the CSEM transmitters, or the CSEM transmitters are arranged on the hull of the surface carrier itself, for example the hull of the exploration ship. Both arrangements demands huge running costs, and only a few exploration/surveillance tasks may defend such running expenses to be used.

The invention of present disclosure will explain how an AUV can power and host a high current low impedance devices, such as a CSEM transmitter, without the need for an expensive surface ship, and umbilical power cable.

Using AUV's for CSEM has very significant advantages over traditional methods:

1. Extremely cost effective
   i. Small vessel and personal count to manage an AUV CSEM survey.
   ii. In some cases no vessel is required during the survey.
2. Minimal environmental impact.

The AUV configured as a CSEM transmitter 10 will operate with externally mounted electrodes 1, 1' as seen illustrated in FIG. 1 showing a typical AUV 20 with source electrode plates 1, 1' underneath.

The electrodes shown inject a known current into seawater, this generates an electromagnetic field which as mentioned earlier has applications in:

1. Detection of conductive mineral deposits, or survey of seabed composition
2. Tracking subsea pipelines, and other conductive structures e.g. unexploded ordnance Though the electrode configuration in FIG. 1 is depicted with electrodes mounted on the bottom of the AUV, other configurations are possible:

1. Electrodes placed diagonally (top, bottom, port or starboard)
2. Electrodes placed on same plane (top, bottom, port or starboard)
3. Electrodes may also be placed external to the body of the AUV via an extending support Generally, the electrode placement should be such that a reasonable separation is achieved between the electrodes.

Figure 2:
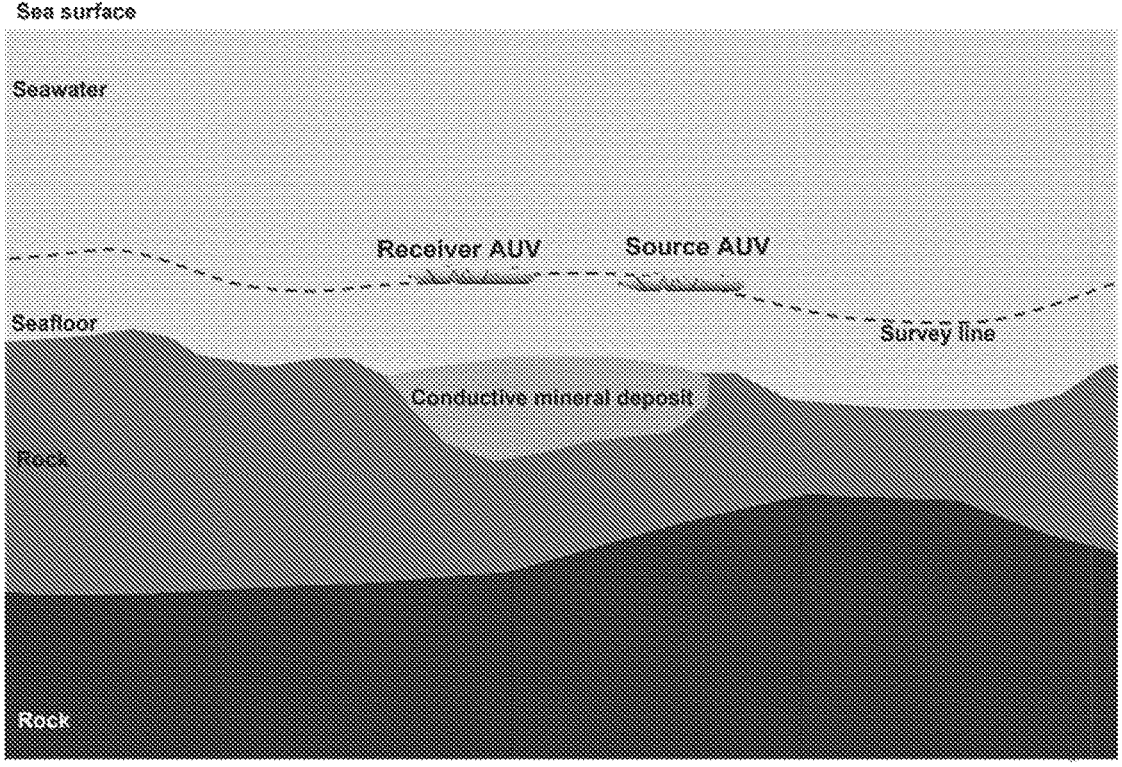
FIG. 2 shows a use scenario of the AUV shown in FIG. 1.

An AUV configured as a CSEM transmitter 10 is usually accompanied with an AUV 20 configured for detection of electromagnetic fields, as shown in FIG. 2.

A CSEM transmitter typically drives a low impedance load, typically the electrical equivalent of a small inductance in series with a low value resistor. Therefore, the output voltage also tends to be quite low.

For the purpose of a general description, we can assume that the load will be in the region of 0.2-0.5 Ohms, and The CSEM source capable of generating an electric current in the region of 50-150 A.

In practice the transmitter may be designed to operate at any current, but will generally be in the region of 10 to 200 A The first aspect of this disclosure shows a power source assembly for powering high current low impedance devices from an Autonomous Underwater Vehicle 20, AUV, battery pack 5,41 and/or auxiliary battery pack, comprising: one or more high current low impedance devices 10, a high current power source 100, 110, 42, 5, wherein the high current low impedance device is powered by the high current power source 100, 110, 42, 5, one or more AUVs 20, the one or more AUVs comprising an AUV battery pack 5 and/or auxiliary battery pack, and the high current power sources 100, 110, 42, 5 being configurable to provide a high current supply to the high current low impedance devices at one or more predefined current ranges.

In the event a battery could be custom built, and/or the required current for driving the high current low impedance device is set low enough, it would be possible to provide an embodiment wherein the AUV battery pack 5 and/or auxiliary battery pack constitutes the high current power source. However, in the following disclosure it is discussed an assembly wherein the high current power source is different form the AUV battery pack 5 and/or auxiliary battery pack.

A standard battery, for operation of either CSEM or AUV will not suffice, as the current rate requirements are high. Custom batteries able to deliver such amounts of current would be very expensive, and thus is not a viable solution, since AUV Battery has max current limit of approx. 20 A. However, for applications as discussed herein, the battery will require 78 A at 48V (to output 100 A at 37V), and this amount of current is outside specification for a standard battery.

Required current output may in one application only be required for, but not limited to, a switching period of approx. 20 seconds, wherein output in 2 seconds every 20 seconds i.e. 2 seconds at 100 A ON, then 18 seconds at 0 A OFF. Other switching periods and configurations may be provided.

A first embodiment of present disclosure suggest that the high current low impedance device 10 further comprises: a high current supply module 15 comprising an electronic circuit adapted to: supply a current from the AUV battery pack 5,41 and/or auxiliary battery pack, store the supplied power in the high current power source 100, 110, 42, and supply high current to a connected high current output device 16.

The device of present disclosure is exemplified with the high current output device 16 being a Controlled Source Electromagnetics, CSEM, transmitter.

It was discovered that the high current power source 100,110 may be provided using a high-capacity capacitor module, Super-CAP module, wherein the super-CAP module comprises one or more high-capacity capacitors 100, Super-CAPs.

Figures 3, 4, 5:
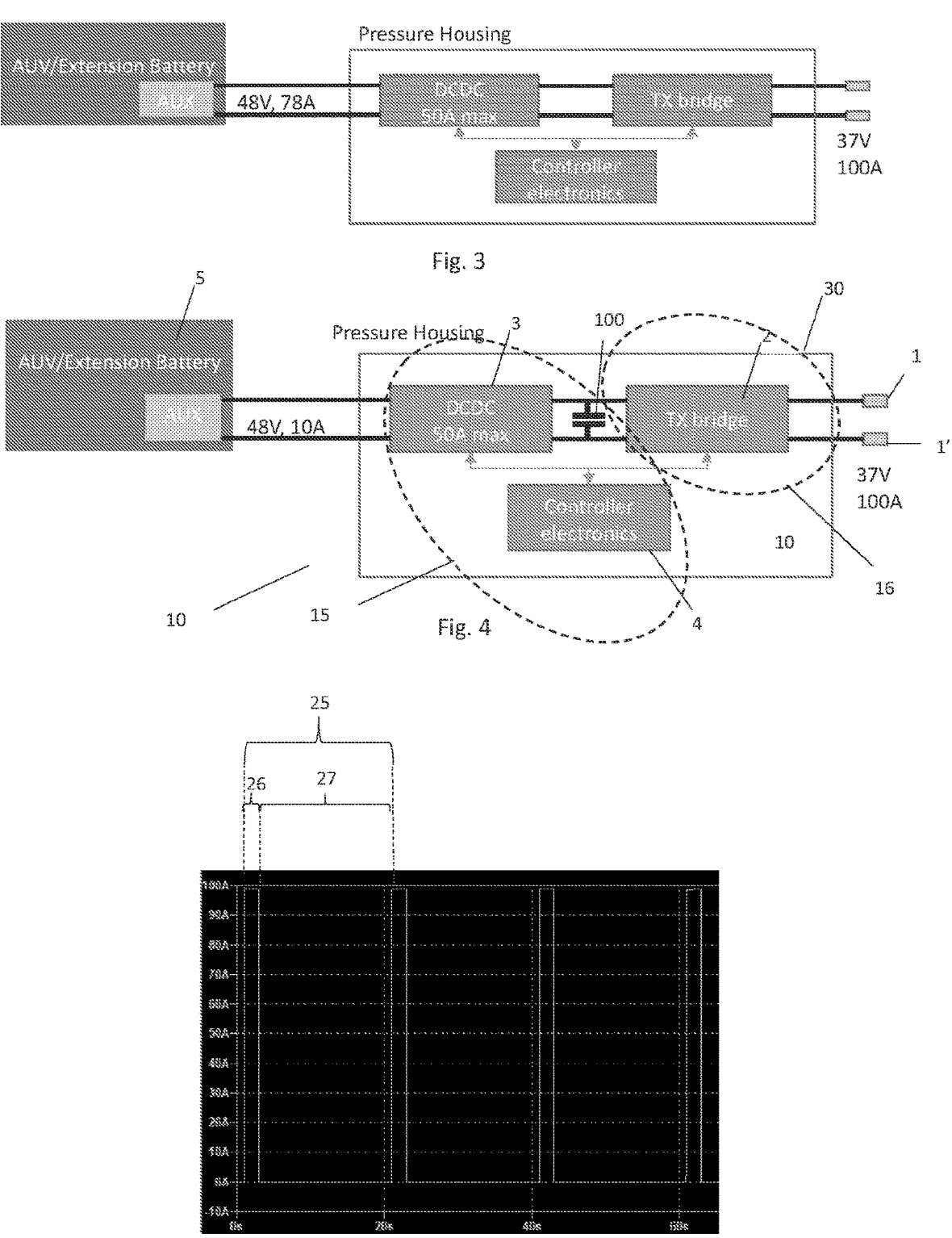
FIG. 3 show outlines requirements to battery pack if prior art battery and logic is used.
FIG. 4 illustrates an overview of an embodiment of present disclosure.
FIG. 5 shows an example target current output profile with embodiment of FIG. 4.

This is exemplified in one embodiment in FIG. 4 wherein the high current supply module 15 further comprises: a DCDC converter 3 coupled to the AUV battery pack 5 and/or auxiliary battery pack, the AUV battery pack 5 and/or auxiliary battery pack supplying power at a preconfigured current rate, and the DCDC converter 3 and the Super-cap module 100,110 is connected to power the high current output device 16.

The scenario in FIG. 4 use a super capacitor 100 to store energy, wherein the Super capacitor may charge itself at a fixed current of for example 20A using the AUV battery as the only/sole power source supplying the capacitor charging current, limited for example to 20 A.

Further auxiliary powers sources/batteries (not shown) may be provided for the task of supplying current to the Super-cap and/or the high current supply module in addition or instead of the AUV battery.

This stored energy is then discharged during a first period of the transmitter pulse cycle.

The high current supply module 15 is configured to:
supply a high current from the super-CAP module 100, 110 to the high current output device 16 for a first predefined period 26 of time of a switching cycle 25, by discharging the one or more Super-CAPs 100, and
supply power at the preconfigured current rate from the AUV battery pack and/or auxiliary battery pack 5 for a second predefined period of time 27 of the switching cycle 25, for recharging the Super-cap module 100,110.

One example pulse cycle is illustrated in FIG. 5, wherein the current supply to a load is outlined, and a current of 100 A is provided in two second before current supply is 0 A for the next 18 seconds. When using a super-CAP module as said above, the super-CAP module may be recharged between every pulse discharges in order to be able to deliver at required top level every cycle. The charge time is defined by the current available at set voltage.

When operating in an AUV environment and deep waters it is a challenge to operate electrical equipment. In one embodiment of present disclosure, the DCDC converter 3 and the Super-cap module 100,110 are arranged in a first pressure housing device 30.

In a further embodiment of present disclosure, the DCDC converter 3 and the Super-cap module 100,110 are arranged in separate first 30 and second 30' pressure housing devices correspondingly.

Figure 6:
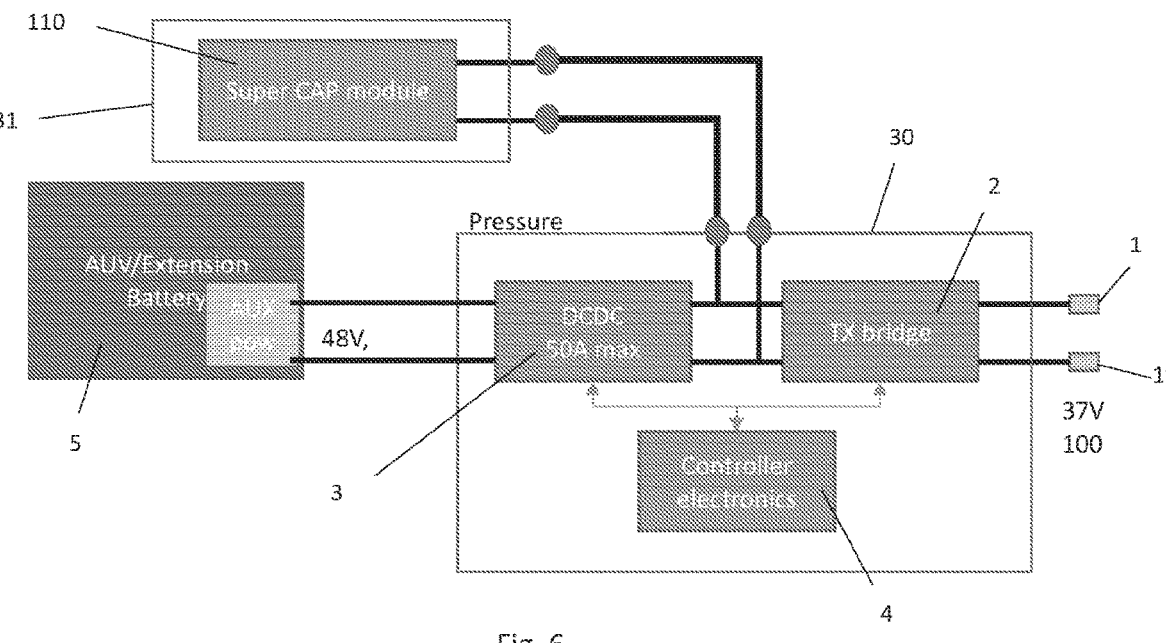
FIG. 6 illustrates an overview of a further embodiment of present disclosure.

Arranged in separate pressure housings as outlined in FIG. 6 may facilitate for easy change, refitting of modules, and in one embodiment one could provide two or more Super-cap modules, wherein each may provide different current output profiles adapted for equipment meant to be driven by such high current power source. The multiple Super-cap modules may be arranged in individual pressure housing devices 31.

In an embodiment of present disclosure, the high current output device 16 is arranged in the first pressure housing device 30. It is also within the inventive concept of present disclosure to provide two or more high current output devices 16, arranged in the same or individual pressure housing devices.

Number of pressure bottles may vary, and any of the modules provided herein may be arranged at convenience in any of the pressure bottles. Arrangements in pressure bottles are necessary when deploying present technology for use in deep waters representing wet high pressure environments.

The high current power source 100,110 is in an advantageous embodiment configured to:
discharge a current rate in the range 25 A to 150 A for a period of more than 1 second, and
charge at a minimum current rate of more than 10 A for a period of more than 2.5 seconds, and thus sustaining a switching cycle 25 wherein the high current power source 100, 110 is sufficiently recharge to enable required discharge current rate for specified discharge period at next discharge period in the switching cycle. Charging at a rate of 10 A would suffice for maintaining a switching cycle of 2.5 seconds and a 25 A supply to the high current low impedance load in one second, being sourced by 15 A discharge from high current power source in addition to the 10 A current fed from the AUV battery pack and/or auxiliary battery pack 5 during discharge period.

In an even more advantageous embodiment the high current power source is configured to:
discharge a current rate of more than 80 A for a period of more than 2 second, and
charge at a minimum current rate of more than 10 A for a period of more than 10 seconds.

In FIG. 9a it is shown a scenario comprising a DCDC converter having no current limit, and a 150 F super-cap module, which will show a peak current from the DCDC converter of up to 60 A, when Super-Cap module is in discharge mode. The Super-cap module configuration here is used as an example only. Any Super-cap able to store/charge/discharge required power for the application it shall be used shall be comprised in present disclosure. Super-caps are provided in a wide variety from lower than 1 F to more than several thousands of Farads, and in various ranges of operation voltage.

FIG. 9B shows an embodiment wherein the DCDC converter current peaks at 20 A using a current limiting DCDC converter.

Figure 7:
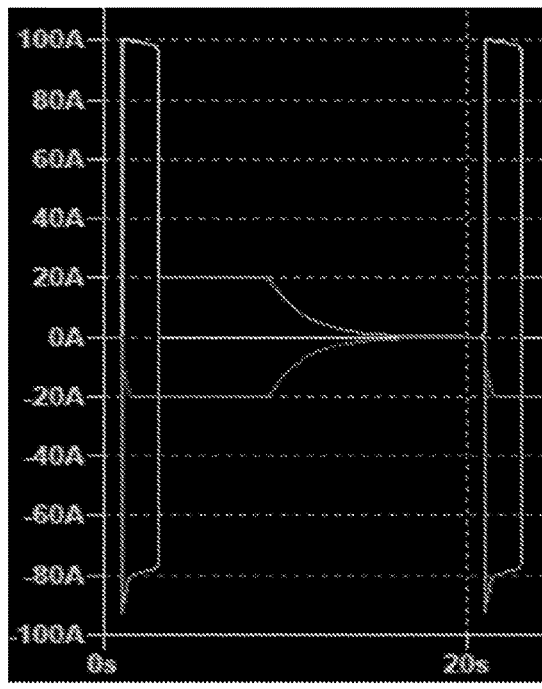
FIG. 7 shows an actual current charge-discharge cycle scenario.

In FIG. 7 it is shown a scenario wherein the Super-cap supplies current during initial Tx cycle of 100 A in approximately 2 seconds, green graph, every 20 second. During this discharge portion of the switching cycle the Super-cap is discharging, supplying Tx 2. As DCDC, when limited to 20 A, can supply 20 A continuous if needed, the takeout from the capacitor may be limited to 80 A, red graph, during switching time with exception of startup wherein the discharge current is 100 A for a brief moment until the AUV and/or auxiliary battery supply kicks in, blue graph, and current supply from the AUV and/or auxiliary battery ramps up to share the load at preconfigured current flow, here 20 A, totaling an output of 100 A (80+20). When the supply portion of the switching cycle is over, the Super-cap enters a recharging portion of the switching cycle, here at a rate of 20 A (AUV and/or auxiliary battery/DCDC configuration), red graph, at which period the Super-cap receives current (max 20 A) supplied by the AUV and/or auxiliary battery, blue graph. Super-Cap will eventually be coming to the end of charging cycle and the charging current will gradually be reduced until Super-cap is fully charged, at which point no current flows, and the charging current drops to 0, until next discharge portion of the switching cycle starts.

The CSEM transmitter typically comprises one or more of: at least one Tx Drive/Bridge 2, a controller module 4, for controlling the at least one Tx Drive/Bridge 2, at least one pair of electric current electrodes 1,1' mounted on the one or more AUVs 20, the at least one pair of electric current electrodes 1,1' being supplied by the Tx Drive/Bridge 2, and the high current power sources 100,110 are electrically connected to and provides current to the Tx Drives/Bridges 2 and the electric current electrode pairs 1,1'. Typically a DCDC converter 3 is connected between the AUV and/or auxiliary battery 5 and the Tx Drive/Bridge 2 in order to adapt to required voltage and current rate demands of the Tx Drive/Bridge 2 and the high current power sources 100,110.

The at least one pair of electric current electrodes 1,1' is one or more of:

high current-low impedance device, and low current-low impedance device.

The high current power sources 100,110 may be specifically configured to match the CSEM load, in one example outputting a current in the region of 100 A, and a power in the region of 20 to 40V depending on the exact load. Other current rates and voltage spans may apply as discussed in present disclosure.

The first embodiment wherein the Transmitter (Tx) Drive 2 is provided as defined in FIG. 4 and FIG. 6 satisfy these requirements.

Figures 10, 12:
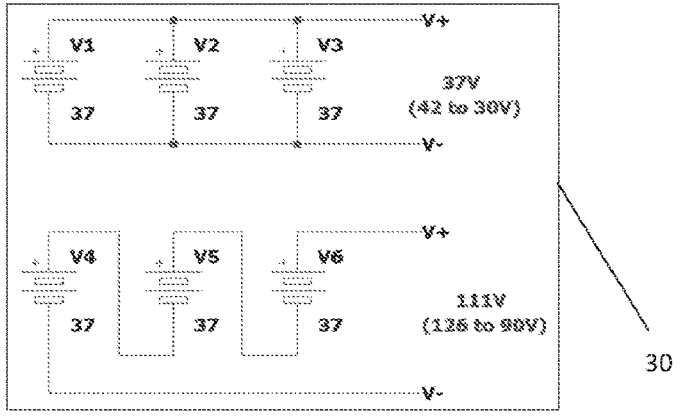
FIG. 10 shows a layout using a CSEM battery pack.
FIG. 12 illustrates two fixed battery connecting configurations.

It is however possible to adapt the technology to provide a Low power version of the Transmitter (Tx) Drive/Bridge, as suggested in FIG. 10, wherein a DCDC converter format the Tx Drive/Bridge input to for example 6V and 15 A. Any current/voltage value may be provided by adapting the DCDC converter and/or Super-cap.

Typically in this disclosure, high current is in the range 50-150 A or possibly as high as 200 A or more, low current is in the range 10-50 A or possibly as low as 1 A, and low impedance device load is in the range 0.1-10 ohm, or more advantageously, 0.1-5 ohms, or even more advantageously 0.2-0.5 ohms.

The controller module 4 enables switching output from the at least one Tx Drive/Bridge 2 in one or more of predefined digital patterns, as exemplified in FIG. 5 and FIG. 8. When depending on the charge/discharge switching periods of a Super-cap module, it is important to allow sufficient charge time, unless a declining max current output may be the result of the Super-cap module.

Choosing the right balance between DCDC current limit and Super-cap value is important. This tasks is basically down to controlling DCDC current limit and/or Super-cap value.

If the Super-cap value of the Super-cap module is too low, the Tx output cannot be maintained, since the Super-cap module will discharge too quickly, resulting in a Tx output as shown in FIG. 9C, but will maintain minimum current rate at 20 A which is equal to the DCDC limit at end of discharge phase.

If DCDC current limit is too low then this will result in a Net drain from the Super-cap module bank since the Net energy in is less then net energy out. This scenario is illustrated in FIG. 9D.

Thus, the task is to provide enough DCDC current to charge the Super-cap module, and enough Super-cap resources to maintain Tx output at required level and time.

Present embodiments may reduce DCDC specifications surprisingly to as low as about 5 A, resulting in smaller and more efficient power source design. Also reducing instantaneous current demand on the AUV main/extension battery is a surprising effect and advantage.

In present scenarios, the DCDC module may be directly connected to the AUV Aux power, if correct voltage and current, for example 48V, and 10 A, is available. The power source assembly may further be adapted for connection to any generic battery system.

A further advantage with present invention is the provision of reduced DCDC power losses since the Super caps are far more efficient at supplying energy than a DCDC converter. Additionally, when a smaller (in power) DCDC is required which is typically more efficient then bigger ones, it may be possible to expect at least 95% efficiency from a well-designed 200 W DCDC converter.

It is advantageous that the DCDC converter comprise a current limit function, such that operating at current limit setting is sufficient to charge the Super-cap module.

A further embodiment may not even need a DCDC converter, if the right balance can be found between charge current vs feasible Super-cap size, and for example 37V Aux DC is available at about 10 A from the AUV and/or auxiliary battery.

The predefined digital patterns may be as exemplified in FIG. 8, but is not limited to one or more of:

continuous burst pulse.

The second aspect of this disclosure shows a method for maintaining a power source assembly for powering high current low impedance devices from an Autonomous Underwater Vehicle, AUV, battery pack 5 and/or auxiliary battery pack, the method may comprise the following steps: for one or more high current low impedance devices, and one or more AUVs:

providing a power source assembly according to the present disclosure, powering at least one pair of the electric current electrodes arranged on the AUV, the electric current electrodes being in contact with seawater, and feeding a preset current to the electric current electrodes from the power source assembly according to a predefined digital pattern.

The third aspect of this disclosure shows a system for powering a high current low impedance devices from an Autonomous Underwater Vehicle the first aspect, AUV, battery pack 5 and/or auxiliary battery pack, the system comprising:

one or more AUV assemblies,
one or more high current low impedance devices and a
power source assembly for powering the high current
low impedance device according to the present disclo-
sure,
a remote control module, and
a communication channel for providing data communi-
cation between the high current low impedance device
and AUVs, and the remote control module.

The remote control module and the communication chan-
nel for maintaining data transmission between the remote
control module and the controller 4 module of the high
current low impedance devices 10 is either continuous or
performed when AUV is in surface position. Data may
comprise configuration data for the high current low imped-
ance devices, the AUV, navigation, the power sources, and
other. The remote control module may be arranged on a
small surface maintenance/operation vessel or on shore
module, or the like.

Figure 19:
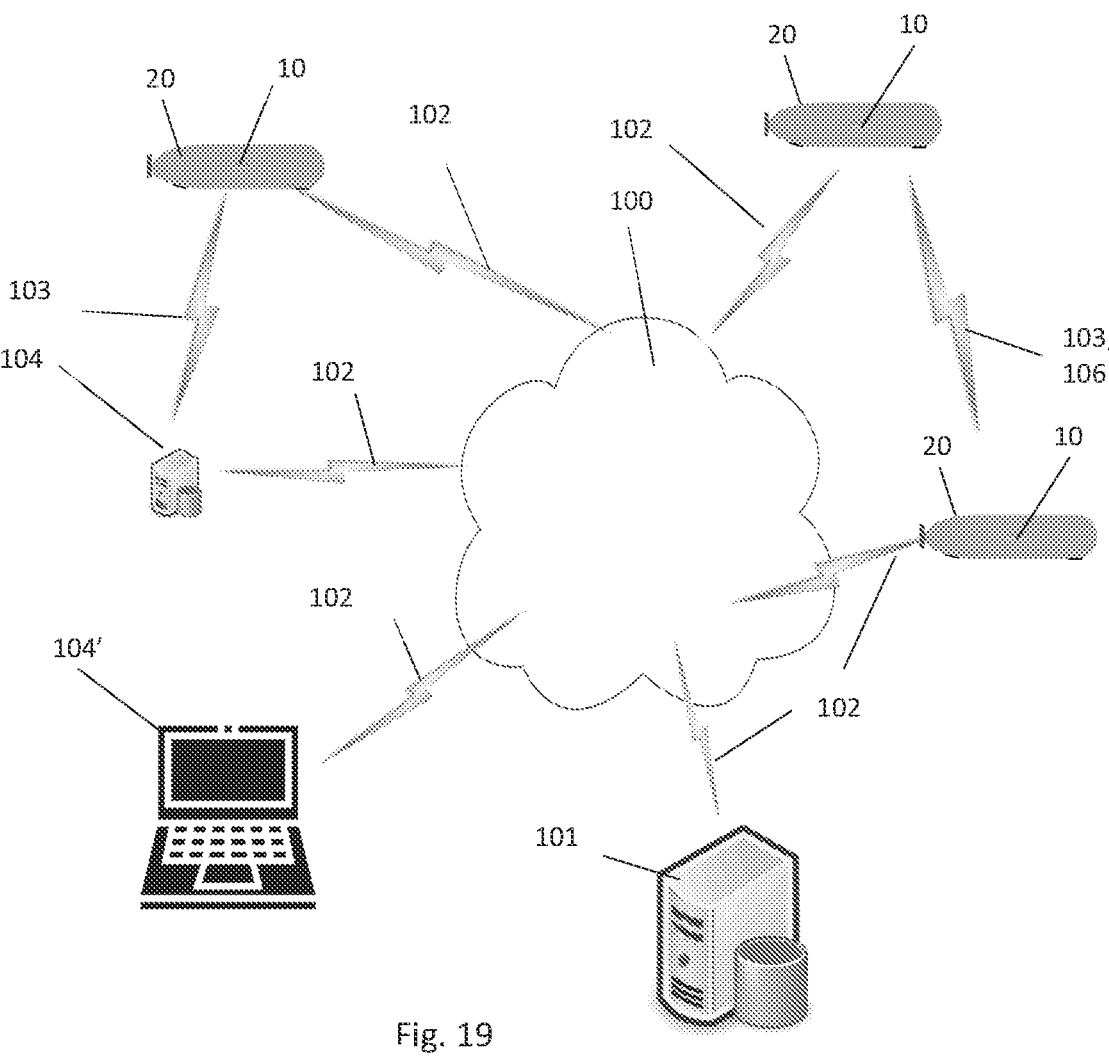
FIG. 19 shows an example system setup.

The remote control module may further be communicat-
ing with a remote host, wherein, typically, the remote host
101 may be maintained as a cloud 100 based service, and the
communication channels 102, 103 being cloud communica-
tion channels via internet connections. Other network based
solutions may also be used to maintain remote hosts, and
optional multiple devices are maintained as outlined in FIG.
19, comprising AUVs 20, standalone computers 104, p104',
servers 101, cloud systems 100 and wired or wireless
communication channels 102, 103 between the entities.

A further embodiment of a solution to the mentioned
problems may be provided as exemplified in FIG. 10 to FIG.
18.

These further embodiments provides a power source
assembly for powering high current low impedance device
and AUV platforms, comprising: one or more high current
low impedance devices, the high current low impedance
device comprising a battery pack 42, one or more AUV
platform assemblies, the AUV platform assemblies compris-
ing a high voltage battery 41, the high current low imped-
ance device battery packs 42 being configurable to provide
a current supply at two or more predefined voltage ranges,
the highest voltage range configuration of the high current
low impedance device battery packs may be substantially
equal to the high voltage range of the AUV platform
batteries.

Any of the high current low impedance device battery
packs and the high voltage battery of the AUV platform
assemblies may be configurable to be used as battery backup
or power charging supply to the other of the high current low
impedance device battery packs and the high voltage battery
of the AUV platform assemblies.

The high current low impedance load device may be a
CSEM transmitter and the CSEM transmitter further com-
prises: at least one Tx Drive/Bridge 2, a controller module,
for controlling the at least one Tx Drive/Bridge 2, at least
one pair of electric current electrodes 1, 1' mounted on the
one or more AUV platform assemblies, the at least one pair
of electric current electrodes being supplied by the Tx
Drive/Bridge 2, and the CSEM battery packs 42 are elec-
trically connected to and provides current to the Tx Drives/
Bridges 2, 2' and the electric current electrode pairs. Such an
alternative high level outline of a proposal for a CSEM
source mounted on an AUV is illustrated in FIG. 10 and FIG.
11.

In FIG. 10 it is shown a battery pack specifically config-
ured to match the CSEM load, outputting for example 100A
in the region of 20 to 40V depending on the exact load. The Transmitter, Tx, Drive is provided in an efficient power
drive, designed to be battery driven, compact and suitable
for mounting on an AUV. An optional Tx Drive mini may be
provided which may be provided as a low power version of
what is proposed above.

The CSEM transmitter shall also be configurable into a
unit that can extend the battery life of the main AUV battery.

It should be noted that a typical AUV battery pack is in the
region of 100 to 120 VDC. A CSEM system will have a
battery pack in the region of 30 to 40 VDC. In order to
facilitate charging, the AUV battery, and/or auxiliary battery
pack, voltage must be presented to match the main AUV
battery, and/or auxiliary battery pack, voltage. The voltage
ranges discussed herein is examples only, and none of the
embodiments in present disclosure is limited to the use of
these as other voltage ranges may equally efficiently be used.
This may be achieved in the following ways:

An embodiment for charging the main AUV battery,
and/or auxiliary battery pack, as described in FIG. 11 is
provided, wherein the solution has the following features:
A "trickle charge" is provided, wherein the DC voltage is
compatible with the AUV battery, or AUV's main and/or
auxiliary battery and is current limited, this may be achieved
by:

a. Boosting the CSEM transmitter battery to a level the
same or slightly higher than the AUV and/or auxiliary
battery
b. The CSEM battery will supply current to the AUV
and/or auxiliary battery as it depletes
c. An electric current limit may be used to control the
maximum amount of electric current drawn from the
CSEM battery pack Any of the high current low impedance device battery
packs, comprise two or more separate battery packs, and the
separate battery packs are manual or electronically recon-
figurable connected to provide two or more voltage source
outputs.

When the battery packs are manually reconfigurable: each
of the two or more high current low impedance device
battery packs are arranged in individual pressure bottles, and
the manual configuration is preconfigured before operation
to be one of connected in:
parallel, or
series.

An alternative approach is to reconfigure the CSEM
battery to make it compatible with the main AUV, and/or
auxiliary battery. For example, if the CSEM battery pack is
37V (nominal) and separated into 3 separate battery packs,
the CSEM battery may can be configured according to FIG.
12 showing a first example where the battery packs are
connected parallel to give 37V nominal for CSEM opera-
tions, and a second example where the battery packs are
connected in series to provide 3×37=111V nominal for
charging the main AUV battery.

There are also electronically methods to facilitate for
charging the main battery. Below follows a few examples of
this.

Figure 13:
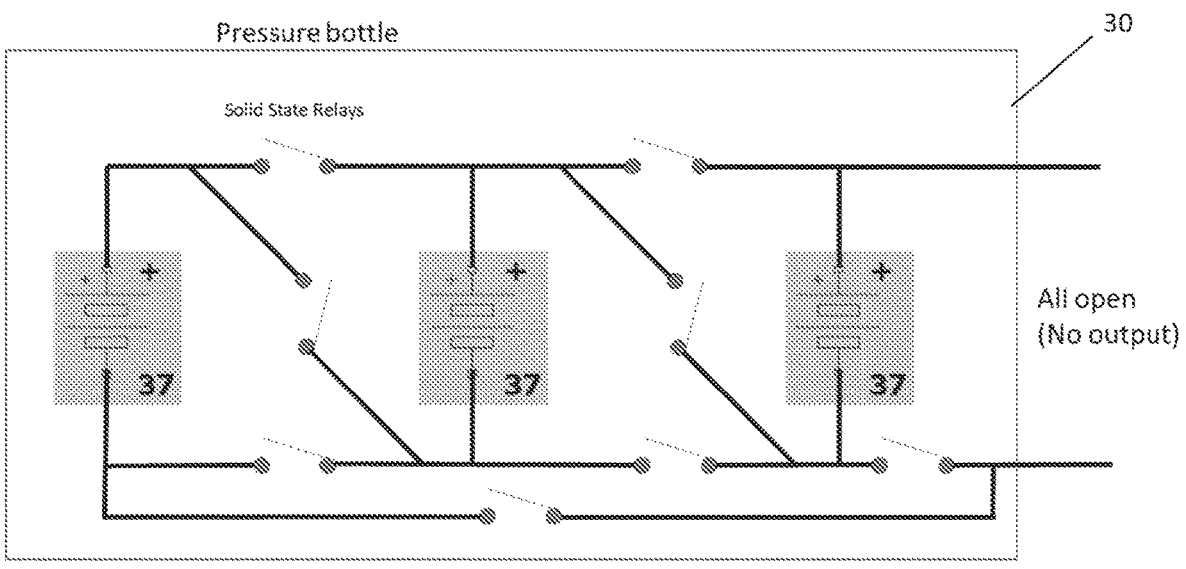
FIG. 13 illustrates a dynamically reconfigurable battery connecting layout in one pressure bottle.
Figure 14:
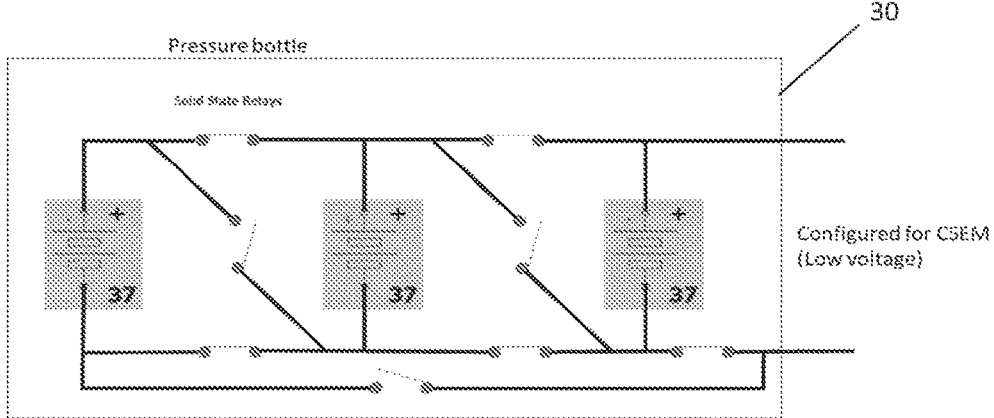
FIG. 14 illustrates battery cells of the battery layout in FIG. 13, connected in series.
Figure 15:
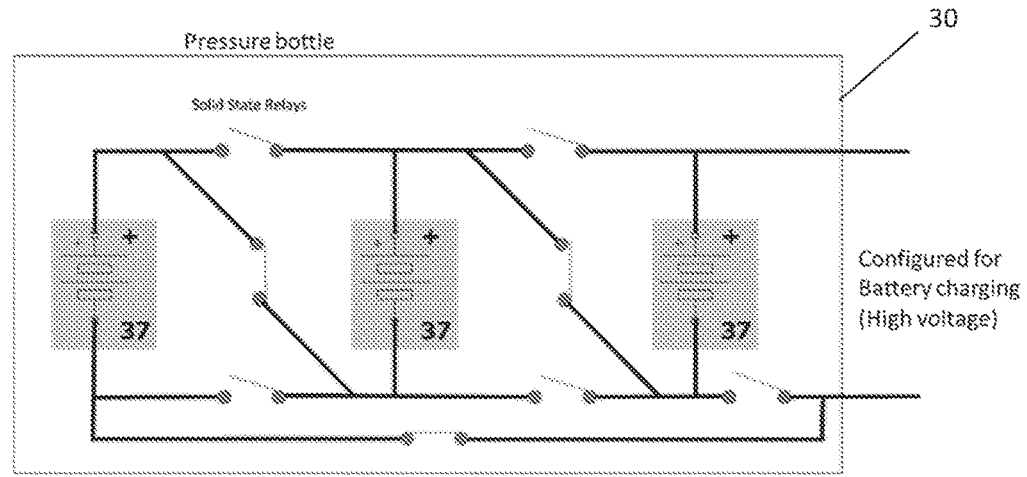
FIG. 15 illustrates battery cells of the battery layout in FIG. 13, connected in parallel.

One way of doing this, which is unique in an AUV
environment, is to use switches (Solid State Relays or
similar) as visualized in as illustrated in FIG. 13, FIG. 14,
and FIG. 15. The solid-state relays may "make and break"
the circuit to electrically match the schematic shown previ-
ously.

FIG. 13 shows an all open, no output scenario, whilst,
FIG. 14 shows the battery configured for CSEM (low
voltage), and lastly in FIG. 15 configured for AUV and/or
auxiliary battery charging (high voltage).

When the battery packs are electrically reconfigurable: all of the two or more high current low impedance device battery packs may be arranged in one pressure bottle, and the electronically configuration may be electronically configurable during operation to be one of connected in:

parallel, or
    series.

The high current low impedance device battery packs are configured to recharge the AUV battery pack and/or auxiliary battery packs.

Figure 16:
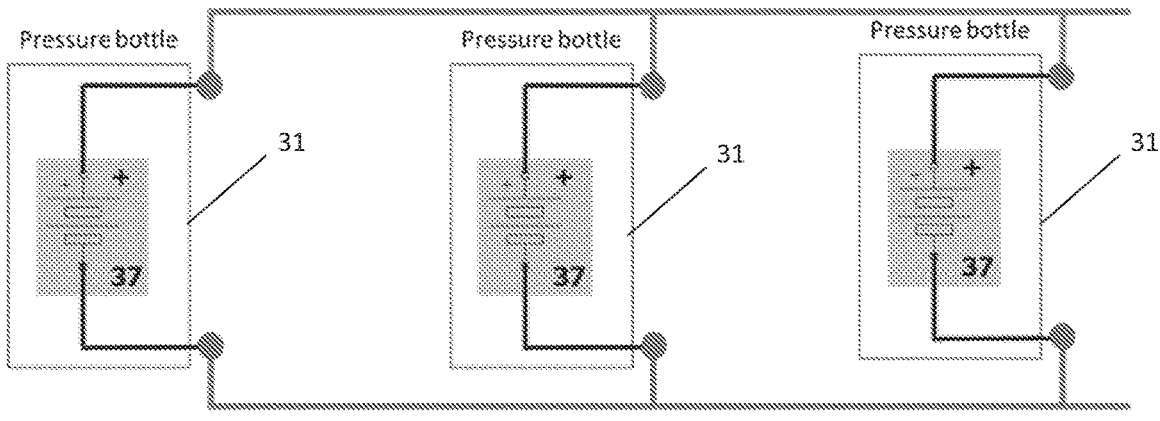
FIG. 16 shows a battery having each battery cells in separate pressure bottles, in parallel.
Figure 17:
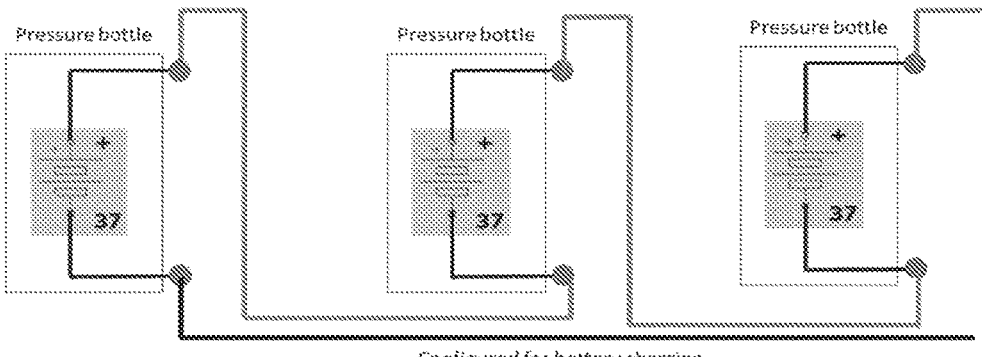
FIG. 17 shows a battery having each battery cells in separate pressure bottles, in series.

An alternative configuration is as a manual option, for example configured for operation for example "on deck" immediately pre deployment, as illustrated in FIG. 16 and FIG. 17. This consists in either splitting the CSEM Tx battery into 3 separate pressure bottle units, or configure via harness on deck either for CSEM or as a battery extender. FIG. 16 shows the manual option configured for CSEM operation, and FIG. 17 shows the manual option configured for AUV and/or auxiliary battery charging.

Figure 18:
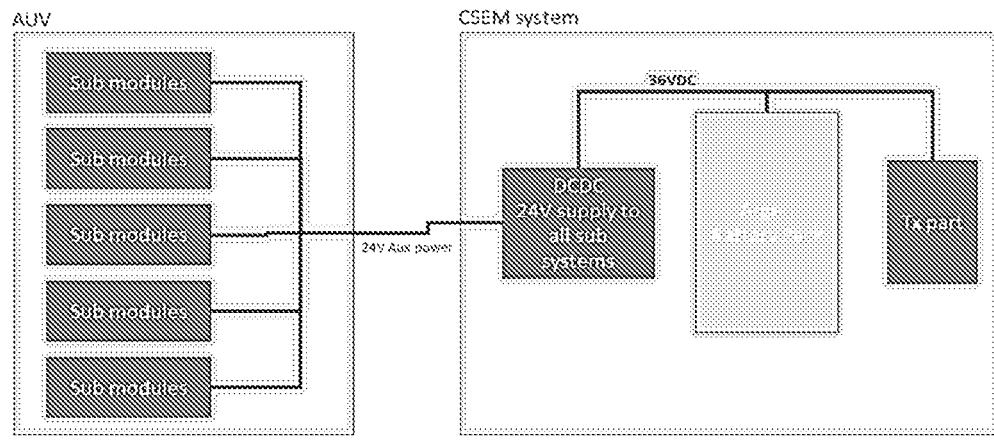
FIG. 18 shows how the CSEM battery pack may power sub modules in the AUV.

A further option facilitates an AUV and/or auxiliary battery extension as illustrate in FIG. 18, wherein from a CSEM battery pack, use the CSEM battery pack to supply auxiliary power to all of the AUV's sub systems, thus, offloading this demand from the AUV's main and/or auxiliary battery.

The high current low impedance device battery packs are thus configured to supply any sub modules comprised in the AUV platform assemblies with power.

The person skilled in the art realizes that the present disclosure is not limited to the preferred embodiments described above. The person skilled in the art further realizes that modifications and variations are possible within the scope of the appended claims Additionally, variations to the disclosed embodiments can be understood and effected by the skilled person in practicing the claimed disclosure, from a study of the drawings, the disclosure, and the appended claims.

The invention claimed is:

1. A power source assembly for powering high current low impedance devices from an Autonomous Underwater Vehicle (AUV), battery pack and/or auxiliary battery packs, comprising:

at least one high current low impedance device, a high current power source, wherein the high current low impedance device is powered by the high current power source; and at least one AUV comprising an AUV battery pack and/or auxiliary battery pack wherein the high current power source is recharged exclusively from the AUV battery pack and/or auxiliary battery pack onboard, and is without power supply from a surface vessel or umbilical, the high current power source configured to provide a high current supply at a set discharge current rate for a specified switching discharge period to the high current low impedance devices at one or more predefined current ranges, including a discharge current of 25-200 A to a low-impedance load of 0.1-10.0Ω, the high current low impedance device further comprising:

a high current supply module comprising an electronic circuit configured to:

supply a current from the AUV battery pack and/or auxiliary battery pack defined by a charge current available at a set voltage;

store a supplied power in the high current power source; and supply a high current at the set discharge current rate to a connected high current output device, wherein charge/discharge switching periods of the high current power source is set to provide a charge period allowing the set discharge current rate to be maintained during the specified switching discharge period, wherein a switching cycle comprises discharging and recharging at current rates and time periods matching a recharge capability of the AUV battery pack and/or auxiliary battery pack, and wherein the high current supply module and the high current power source are enclosed in subsea pressure housings integrated with a hull of the AUV.

2. The power source assembly according to claim 1, wherein the high current output device is a Controlled Source Electromagnetics (CSEM) transmitter.

3. The power source assembly according to claim 2, wherein the CSEM transmitter further comprising:

at least one Tx Drive/Bridge;

a controller module, for controlling the at least one Tx Drive/Bridge;

at least one pair of electric current electrodes mounted on the one or more AUVs, the at least one pair of electric current electrodes being supplied by the at least one Tx Drive/Bridge; and the high current power source is electrically connected to and provides a current to the at least one Tx Drive/Bridge and the at least one pair of electric current electrode.

4. The power source assembly according to claim 3, wherein:

the at least one pair of electric current electrodes is a wide range high current-low impedance device;

wide range high current range is in the range 10-200 A; and low impedance device load is in the range 0.1-10 ohms.

5. The power source assembly according to claim 3, wherein:

the at least one pair of electric current electrodes is one or more of:

high current-low impedance device; and low current-low impedance device.

6. The power source assembly according to claim 5, wherein:

high current is in the range 25-150 A;

low current is in the range 1-25 A; and low impedance device load is in the range 0.2-0.5 ohms.

7. The power source assembly according to claim 3, wherein:

the controller module enables switching output from the at least one Tx Drive/Bridge in one or more of predefined digital patterns.

8. The power source assembly according to claim 7, wherein:

the predefined digital patterns is at least one of continuous, burst, or pulse.

9. The power source assembly according to claim 1, wherein the high current power source is a high-capacity capacitor module (Super-CAP module), the super-CAP module comprising one or more high-capacity capacitors (Super-CAPs).

10. The power source assembly according to claim 9, the high current supply module further comprising:

a DCDC converter coupled to the AUV battery pack and/or auxiliary battery pack, the AUV battery pack and/or auxiliary battery pack supplying power at a limited preconfigured current rate; and the DCDC converter and the Super-cap module is connected in parallel to power the high current output device.

11. The power source assembly according to claim 10, wherein the high current supply module is configured to:

source a high current from the super-CAP module to the high current output device for a first predefined period of time of the switching cycle, by discharging the one or more Super-CAPs; and supply power at the limited preconfigured current rate from the AUV battery pack and/or auxiliary battery pack for a second predefined period of time of the switching cycle, for recharging the Super-cap module.

12. The power source assembly according to claim 10, wherein the DCDC converter and the Super-cap module are arranged in a first pressure housing device.

13. The power source assembly according to claim 10, wherein the DCDC converter and the super-CAP module are arranged in separate first and second pressure housing devices correspondingly.

14. The power source assembly according to claim 13, wherein the high current output device is arranged in a first pressure housing device of the separate first and second pressure housing devices.

15. The power source assembly according to claim 1, wherein the high current power source is configured to:

discharge a current rate in the range 25 A to 150 A, or more, for a period of more than 1 second; and charge at a minimum current rate of more than 10 A for a period of more than 2.5 seconds, and thus sustaining the switching cycle wherein the high current power source is sufficiently recharged to enable required discharge current rate for specified discharge period at next discharge switching period.

16. The power source assembly according to claim 15, wherein the high current power source is configured to:

discharge at a current rate of more than 80 A for a period of more than 2 seconds; and charge at a minimum current rate of more than 10 A for a period of more than 10 seconds.

17. A method for maintaining a power source assembly for powering high current low impedance devices from an Autonomous Underwater Vehicle (AUV) and/or auxiliary battery pack, the method comprising, for at least one high current low impedance device, and at least one AUV:

providing the power source assembly of claim 1;

powering at least one pair of electric current electrodes arranged on the AUV, the electric current electrodes being in contact with seawater; and feeding a preset current rate to the electric current electrodes from the power source assembly according to a predefined digital pattern.

18. A system for powering a high current low impedance devices from an Autonomous Underwater Vehicle (AUV) and/or auxiliary battery pack, the system comprising:

one or more AUV assemblies;

at least one high current low impedance device and the power source assembly of claim 1 for powering the high current low impedance;

a remote control module; and a communication channel for providing data communication between the at least one high current low impedance device and the one or more AUV assemblies, and the remote control module.

19. The power source assembly according to claim 1, wherein the switching cycle comprises:

discharging at a current of 80-120 A for 2-3 seconds; and recharging at a current of 15-20 A for at least 10 seconds, thereby matching the recharge capability of the AUV battery pack and/or auxiliary battery pack onboard.

20. The power source assembly according to claim 1, wherein an impedance of the low-impedance load is in the range of 0.2-0.5Ω.

21. The power source assembly according to claim 1, wherein the high current output device comprises a pair of electrodes mounted externally on the hull of the AUV, separated by a distance sufficient to inject a current into seawater for controlled source electromagnetic surveying.

\* \* \* \* \*